(12) United States Patent
Sanfilippo (10) Patent No.: US 6,745,803 B2
(45) Date of Patent: Jun. 8, 2004

(54) PORTABLE WOODWORKING DEVICE

(76) Inventor: Anthony Sanfilippo, 2005 St. Andrews Dr., St. Charles, MO (US) 63301

( * ) Notice: Subject to any disclaimer, the term of this patent is extended or adjusted under 35 U.S.C. 154(b) by 95 days.

(21) Appl. No.: 10/101,826

(22) Filed: Mar. 21, 2002

(65) Prior Publication Data

US 2003/0178099 A1 Sep. 25, 2003

(51) Int. Cl.$^7$ .............................. B25H 1/04; B25H 1/16
(52) U.S. Cl. .................................. 144/286.5; 83/477.2
(58) Field of Search ......................... 144/286.5, 286.1, 144/287, 3.1, 1.1; 269/318; 83/468, 468.7, 477, 477.2, 438, 471

(56) References Cited

U.S. PATENT DOCUMENTS

| | | | | |
|---|---|---|---|---|
| 4,265,284 A | * | 5/1981 | Taylor | 144/287 |
| 4,362,196 A | * | 12/1982 | Ferdinand et al. | 144/286.1 |
| 4,561,336 A | * | 12/1985 | Davis | 83/859 |
| 4,566,661 A | * | 1/1986 | Mestler | 248/171 |
| 4,860,807 A | * | 8/1989 | Vacchiano | 144/286.1 |
| 5,080,152 A | * | 1/1992 | Collins et al. | 144/154.5 |
| 5,115,847 A | * | 5/1992 | Taber | 144/287 |
| 5,145,311 A | * | 9/1992 | Salvucci | 414/592 |
| 5,398,740 A | * | 3/1995 | Miller | 144/286.1 |
| 5,431,206 A | * | 7/1995 | McAllister | 144/286.1 |
| 5,697,180 A | * | 12/1997 | Morizio | 42/94 |

* cited by examiner

Primary Examiner—Allen Ostrager
Assistant Examiner—Shelley Self
(74) Attorney, Agent, or Firm—Henry W. Cummings (57) ABSTRACT

The present invention involves a metal structure which has provisions for mounting a common hand held electric circular saw while supporting the wood being cut. Using the same tool, a woodworker may make accurate crosscuts, miter cuts, compound cuts, and rip cuts in a wide variety of wood components. Adjustable support wings can be employed to support long pieces of wood, particularly during the ripping process. Integrally mounted wheels provide means for easily moving the invention from one place to another. The invention's small size and light weight allow it to be stored when not in use.

13 Claims, 7 Drawing Sheets

PORTABLE WOODWORKING DEVICE

I FIELD OF THE INVENTION

This invention relates to a portable woodworking device, particularly related to adapting a hand saw for a variety of applications.

II BACKGROUND OF THE INVENTION

Powered woodworking equipment such as radial arm saws and table saws are very expensive, require a lot of room to operate and store, are not very portable, and are able to do only one task well.

The present invention adapts a common hand held electric circular saw to a lightweight, portable structure, enabling the woodworker to do a variety of jobs. When the work is done, the structure and saw may easily be moved and stored, requiring a minimum of space. Since most home woodworkers already own a circular saw, the only cost involved is that of the structure itself, saving the woodworker the price of two large expensive units. The present invention is a distinct improvement over past attempts to adapt hand tools for jobs usually performed by single-purpose power tools.

For example, U.S. Pat. No. 2,556,137, U.S. Pat. No. 2,630,146, U.S. Pat. No. 3,331,406, and U.S. Pat. No. 4,181,057 all disclose radial arm type sawing devices. The concepts disclosed in those patents all employ heavy, complicated components. They are not self-contained, nor do they lend themselves to ease of portability. In addition, they limit themselves to one purpose: that of a radial arm saw.

U.S. Pat. No. 3,151,642 and U.S. Pat. No. 3,866,496 are designed to saw large panels such as sheets of particleboard or plywood. They are not easily portable and are not adaptable to fulfill another function, such as that of a table saw.

U.S. Pat. No. 2,770,265 discloses a combination guide and portable support for power saws. U.S. Pat. No. 2,911,017 discloses a miter guide. U.S. Pat. No. 4,448,102 discloses a compound miter saw stand. These concepts s are intended to perform the function of a miter saw to make cuts at various angles on dimensional lumber such as 2×4 s. There are no provisions for ripping plywood sheets or the like, nor do they have provisions for supporting large workpieces or for ease of portability.

U.S. Pat. No. 2,803,271 discloses a combination table and miter guide for portable power saws. While this concept allows the user to perform functions associated with miter or radial arm saws and table saws, the portable saw must be dismounted, moved, and remounted to achieve this. In addition, the concept incorporates a large heavy table which is not easy to transport or to store in a small space.

U.S. Pat. No. 4,320,678 discloses a portable power tool accessory table. This invention allows use of various power tools such as sabre saws, routers, and circular saws. With respect to sawing wood, this concept is limited to crosscut type work, as it is impossible to fix the position of the power tool with respect to the tracks on which it travels. In addition, there is no provision for supporting long workpieces.

U.S. Pat. No. 5,080,152 discloses a versitile precision woodworking apparatus. U.S. Pat. No. 5,107,736 discloses a saw mount for use on a conventional workshop table. Neither concept has any provision for rip cuts.

U.S. Pat. No. 4,105,055 discloses a portable workshop. This concept combines the features of numerous separate power tools, but contains a plurality of removable parts and is quite complicated to configure for the different tools.

U.S. Pat. No. 4,807,506 discloses a portable saw table. This concept, while employing folding legs, is difficult to move and bulky to store.

U.S. Pat. No. 5,394,781 and U.S. Pat. No. 5,651,298 disclose concepts which are similar in nature to the present invention, but are very unduly complicated.

III SUMMARY OF THE INVENTION

A. Objects of the Invention

One object of the present invention is to provide an inexpensive alternative to expensive shop equipment.

Another object of the invention is to provide a means for a woodworker to make precision compound, crosscut, and rip cuts in wood, using the same tool.

Another object of the invention is to provide a means to support the wood being cut without using permanent tables or movable stands.

Another object of the invention is to provide means for moving and storing the invention when not in use.

Another object of the invention is to offer increased safety to the user inasmuch as the saw blade points down away from the user, and is difficult to reach by hand.

Another object of the invention is to be easily manufactured from as few different parts as possible, and using some components which are commercially available.

Other objects will be apparent from the following Descriptions and Drawings.

B. Summary

The present invention comprises a metal structure which has provisions for mounting a common hand held electric circular saw while supporting the wood being cut. Using the same tool, a woodworker may make accurate crosscuts, miter cuts, compound cuts, and rip cuts in a wide variety of wood components. Adjustable support wings can be employed to support long pieces of wood, particularly during the ripping process. Integrally mounted wheels provide means for easily moving the invention from one place to another. The invention's small size and light weight allow it to be stored when not in use.

V. DESCRIPTION OF PREFERRED EMBODIMENTS

Figure 1:
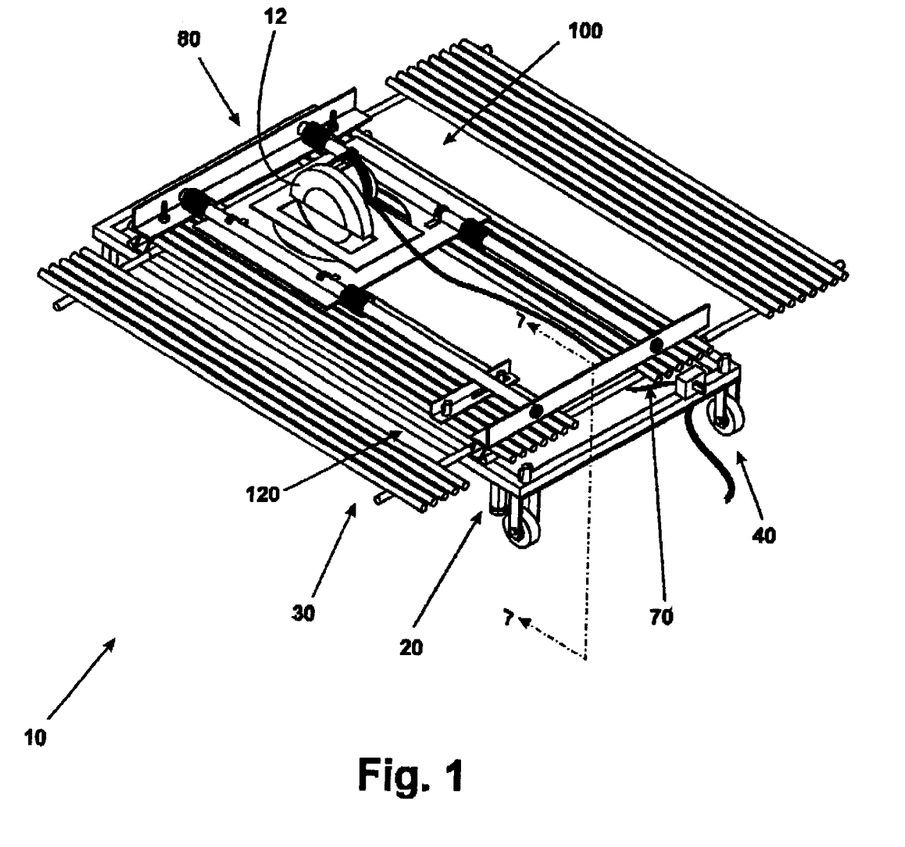
FIG. 1 is a perspective view of all elements of the present invention.

In accordance with the present invention, FIG. 1 shows a perspective view of the complete assembly, indicated generally at 10. All subassemblies are shown and will be discussed subsequently.

Figure 2:
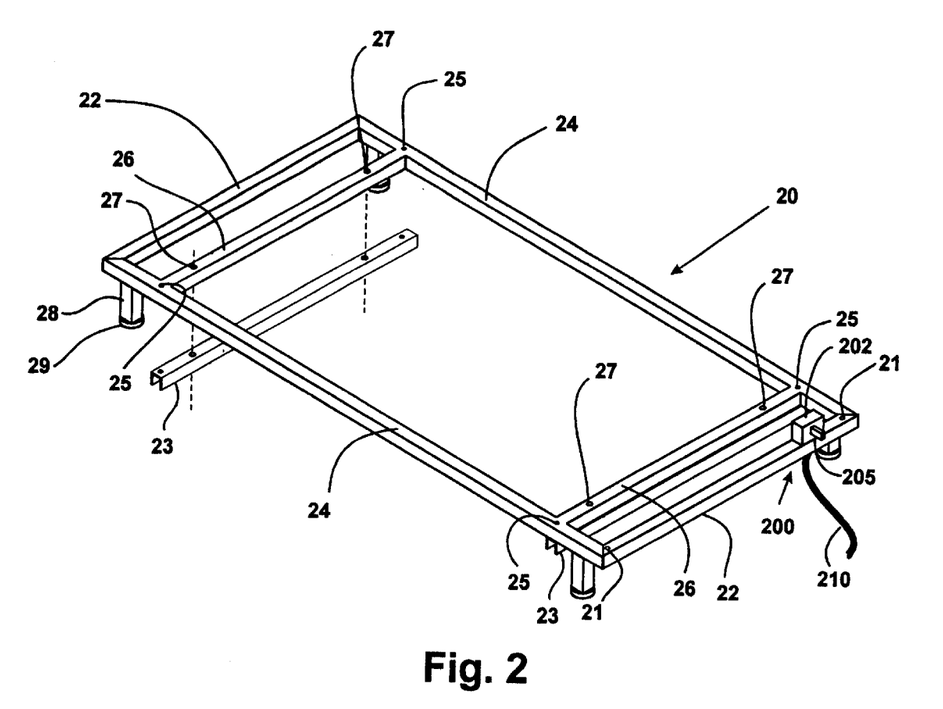
FIG. 2 is a perspective view of the frame subassembly.

FIG. 2 shows the frame subassembly, generally at 20. Frame subassembly 20 comprises frame ends 22 and frame sides 24, which are mitered at the corners and welded together. Two frame interior braces 26 are welded to frame sides 24. Frame ends 22, frame sides 24, and frame interior braces 26 are constructed of square metal tubing, preferably aluminum, which provides strength and light weight. Lower "U" channels 23 are constructed of steel or aluminum and are attached to the rest of frame subassembly 20 when other subassemblies are mounted. Lower "U" channels 23 provide extra strength to frame subassembly 20. Legs 28 are made of square metal tubing, preferably aluminum, and are welded to the underside of frame sides 24.

Feet 29 are attached to the bottoms of legs 28. Feet 29 may be metal, plastic, or rubber. Feet 29 may comprise suction cups to permit the assembly to be releaseably attached to a table top.

Switch assembly 200 is mounted to one frame end 22. Switch assembly 200 comprises switch housing 202, switch 205, switch receptacle 210, and power cord 215. The cord from the portable electric circular saw 12 is inserted in switch receptacle 210, and power cord 215 is inserted in a convenient electrical outlet. The operation of the saw 12 is therefore controlled by switch 205, which is easily reached by the user.

Figure 3:
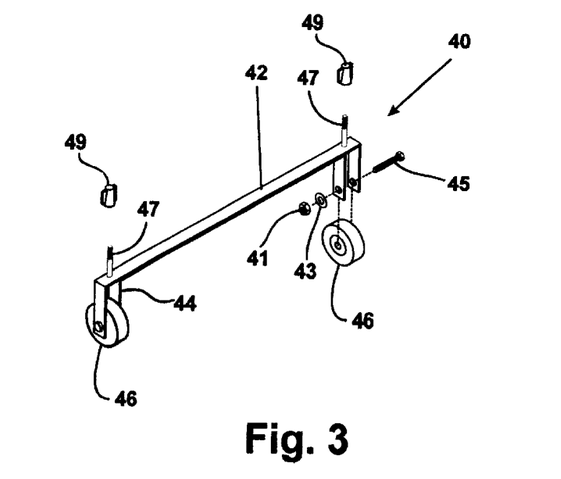
FIG. 3 is a perspective view of the roller subassembly.

FIG. 3 shows the roller subassembly generally at 40. Roller assembly 40 comprises a main frame 42 and a subframe 44, which are constructed of flat bar stock, bent at a 90 degree angle at the ends and welded together as shown. Wheels 46 are commercially available units which may contain roller bearings to provide long life and smooth operation. Wheels 46 are attached to main frame 42 and sub frame 44 by means of nuts 41, washers 43, and bolts 45. Studs 47 are provided to allow roller subassembly 40 to mount to frame subassembly 20 through holes 21. Wing nuts 49 secure roller subassembly 40 to frame subassembly 20.

Figure 4:
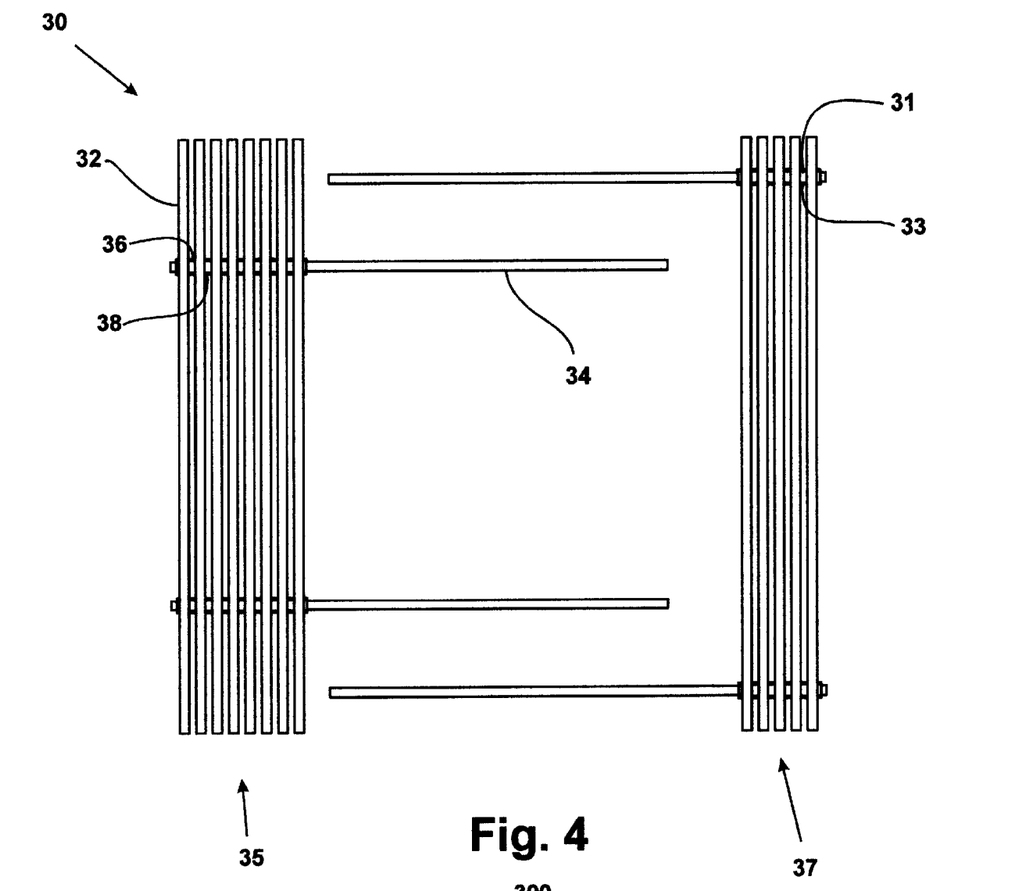
FIG. 4 is a top view of the extension subassemblies.

FIG. 4 shows extension subassembly generally at 30. Extension subassembly 30 comprises short extension assembly 37 and long extension assembly 35. The extension assemblies are of unequal size to allow the user to reach the mounted hand saw without placing his or her body in an unsafe position. Each extension assembly comprises two movable extension assembly mounting tubes 34 and a plurality of workpiece surface tubes 32. All tubes are hollow, and are made of steel or aluminum.

Figure 5:
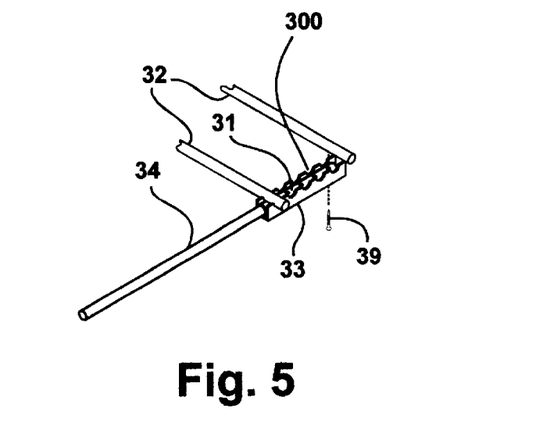
FIG. 5 is a perspective detail view of the parts contained in the extension subassemblies.

FIG. 5 details the construction of short extension assembly 37. Short extension assembly "U" channel 33 is constructed of steel or aluminum, with a series of semicircular cutouts 300 in both sides, the number of which matches the number of workpiece surface tubes 32 contained in that assembly. The purpose of semicircular cutouts 300 is to retain workpiece surface tubes 32 in relationship to each other and to the rest of short extension assembly 37. Nested inside short extension assembly "U" channel 33 is short extension shim tube 31, whose purpose is to raise the work surface of short extension assembly 37 to equal that of workpiece support assembly 70. Movable extension assembly mounting tube 34 telescopes inside short extension tube 31. Workpiece surface tubes 32 are mounted to short extension assembly "U" channel 33 by means of thread forming screws 39 protruding up through short extension assembly "U" channel 33 and short extension shim tube 31, into workpiece surface tubes 32. Long extension assembly 35 is constructed in a similar manner. Note that moveable extension assembly mounting tubes 34 are farther apart on short extension assembly 37 than they are on long extension assembly 35. This facilitates their proper mounting on workpiece support assembly 70.

Figure 6:
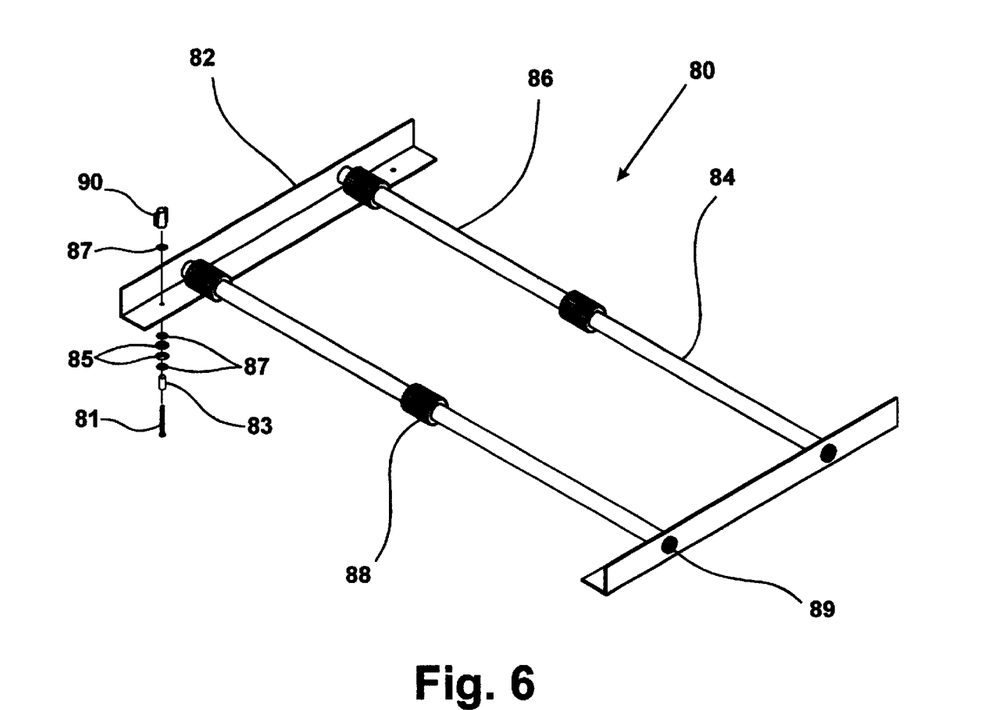
FIG. 6 is a perspective view of the cradle subassembly.

FIG. 6 shows the cradle subassembly generally at 80. Cradle subassembly 80 provides means for mounting saw turntable base assembly 100 as will be detailed later. Cradle subassembly 80 comprises angles 82 which are heavy duty steel or aluminum "L" angle. Two small diameter tubes 84 are mounted to angles 82 through holes in angles 82. Rubber caps 89 provide an attractive closure to the hollow ends of small diameter tubes 84. Large diameter tubes 86 telescope over small diameter tubes 84 and are free to slide along their length.

Friction locks 88 are commercially available units which are in widespread use wherever there is a requirement to temporarily fix two telescoping components firmly with respect to one another. Friction locks 88 are mounted to large diameter tubes 86, and are acuated by holding one end of friction lock 88 and turning the other. Doing so prevents large diameter tubes 86 from sliding along small diameter tubes 84.

Figure 7:
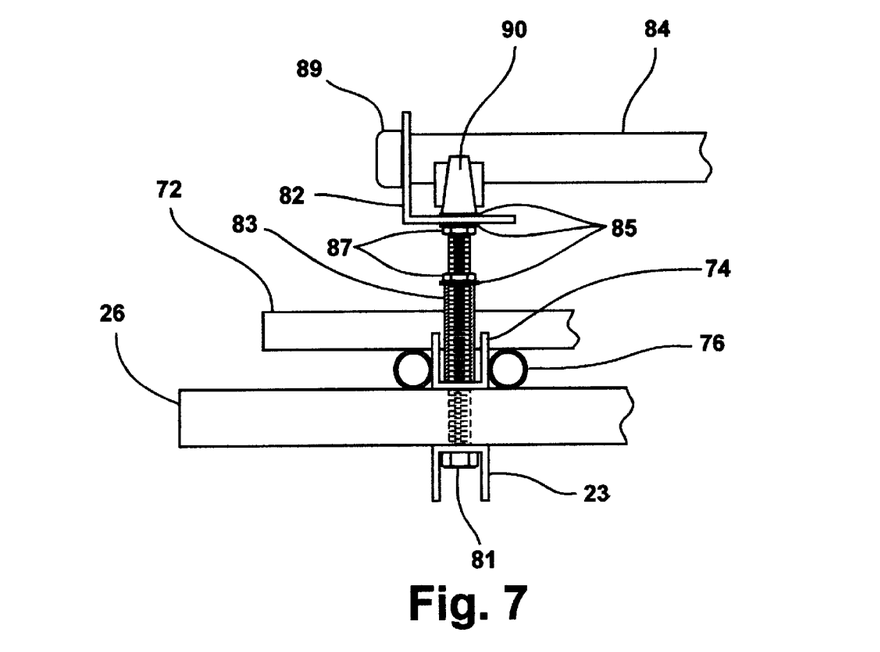
FIG. 7 is a section view of how most of the major subassemblies are assembled.

As shown in FIG. 7, angles 82 of cradle subassembly 80 are mounted to the remainder of the assembly by means of bolts 81, coupler, 83, washers 85, nuts 87, and wing nut 90. Cradle subassembly 80 may be raised and lowered by means of adjusting the location of angles 82 on bolts 81. This is accomplished by loosening wing nuts 90 and nuts 87. When cradle subassembly is at the desired height, nuts 87 and wing nuts 90 are tightened.

Figure 8:
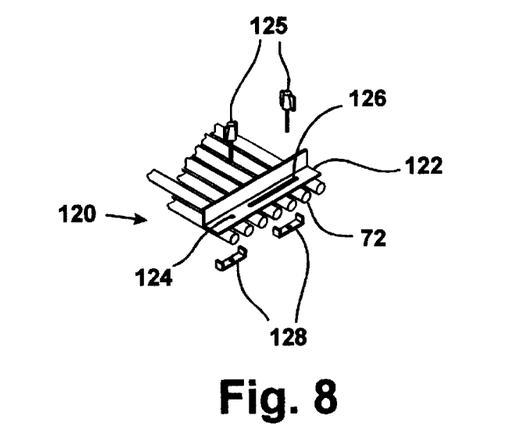
FIG. 8 is a perspective view showing how a fence subassembly is mounted.
Figure 9:
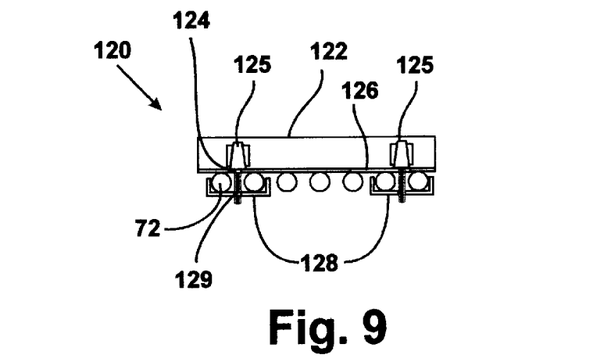
FIG. 9 is an end view of a segment of the invention detailing how the fence subassembly is mounted.
Figure 10:
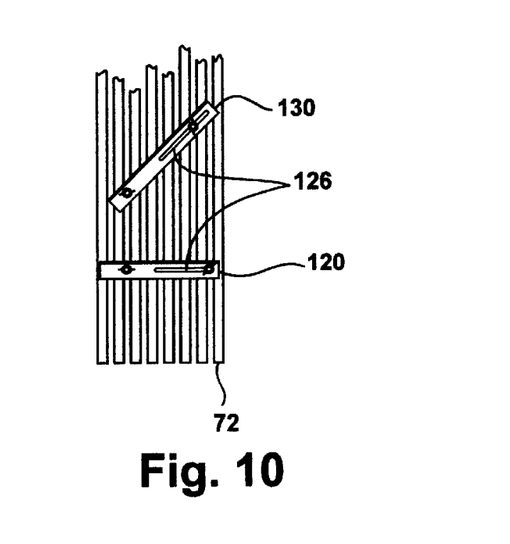
FIG. 10 is a top view of a segment of the invention showing two possible orientations of the fence subassembly.

FIGS. 8, 9, and 10 show the components of the various fence subassemblies and how they mount to the assembly of the present invention. Short fence subassembly 120 may be placed anywhere on workpiece support subassembly 70. Fence angle 122 lays across workpiece surface tubes 72, and is secured in place by wing screws 125 and compression clamps 128, via hole 124 and elongated slot 126. Each compression clamp 128 has a threaded hole 129. Tightening wing screws 125 pulls compression clamps 128 up against workpiece surface tubes 72, securing fence angle 122. FIG. 10 shows short fence assembly 120 mounted at a 90 degree angle to workpiece surface tubes 72. This allows the wood being cut to be held firmly perpendicular to the saw's motion. Medium fence assembly 130 is shown mounted at a 45 degree angle as an example, but the fences can be mounted at any angle required by the user.

Holes 124 keep the fence assemblies fixed laterally with respect to workpiece surface tubes 72, while allowing the fences to pivot about the mounting point. Elongated slot 126 permits the fence to be firmly mounted at any convenient angle.

Figure 11:
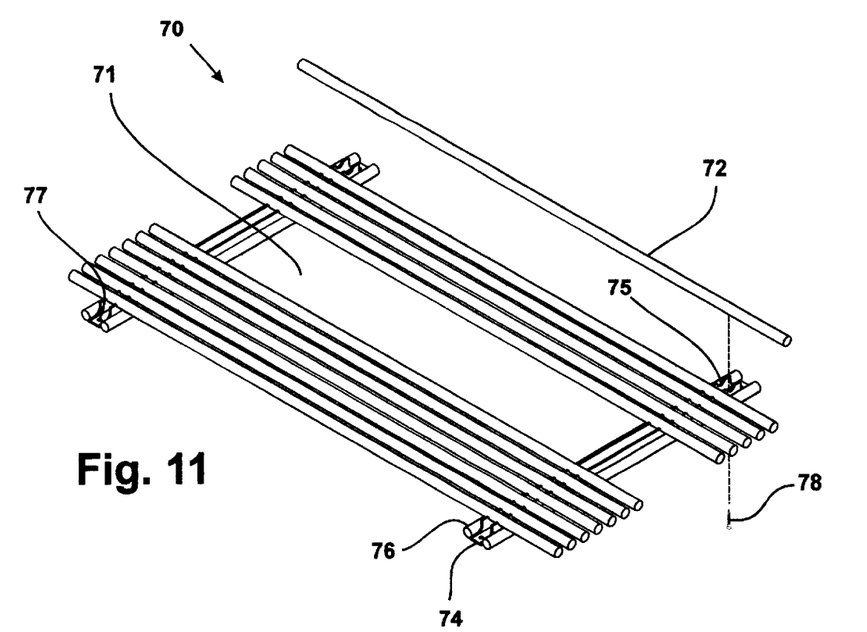
FIG. 11 is a perspective view of the workpiece support subassembly.

FIG. 11 shows the workpiece support subassembly generally at 70. Workpiece support assembly 70 comprises two "U" channels 74, a plurality of workpiece surface tubes 72, and fixed extension mounting tubes 76. Fixed extension mounting tubes 76 are made of steel or aluminum. "U"

channels 74 are made of metal, preferably aluminum, and have a plurality of semicircular cutouts 75 whose purpose is to retain workpiece surface tubes 72 in relationship to each other and to the rest of workpiece support assembly 70. Workpiece surface tubes 72 are made of steel or aluminum and are mounted to "U" channels 74 by means of thread forming screws 78 protruding up through "U" channels 78 into workpiece surface tubes 72. Mounting holes 77 are provided in "U" channels 78 as means to mount workpiece support assembly 70 to frame 20. Gap 71 exists between the two series of workpiece surface tubes 72 to allow the saw blade to protrude down past the wood to be cut without interfering with any portion of workpiece support assembly 70. This is true no matter in what orientation the saw is placed.

Figure 12:
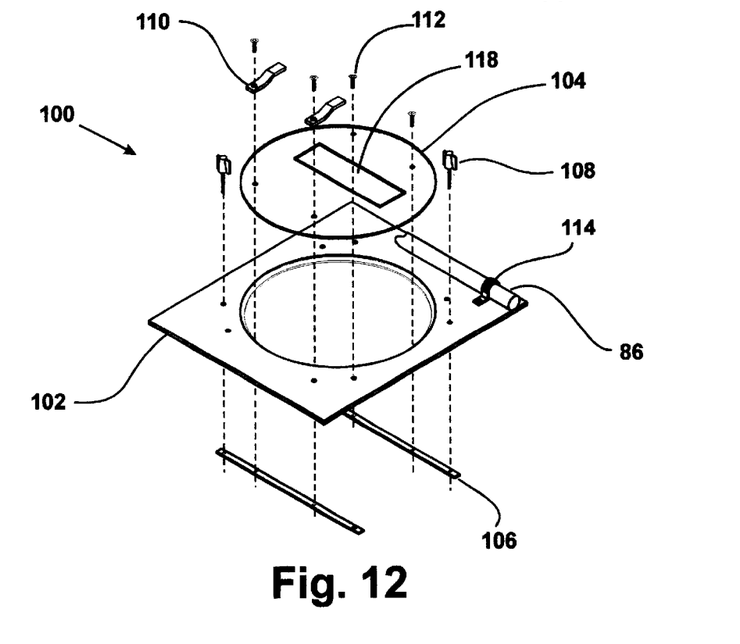
FIG. 12 is a perspective view of the saw turntable base subassembly.
Figure 13:
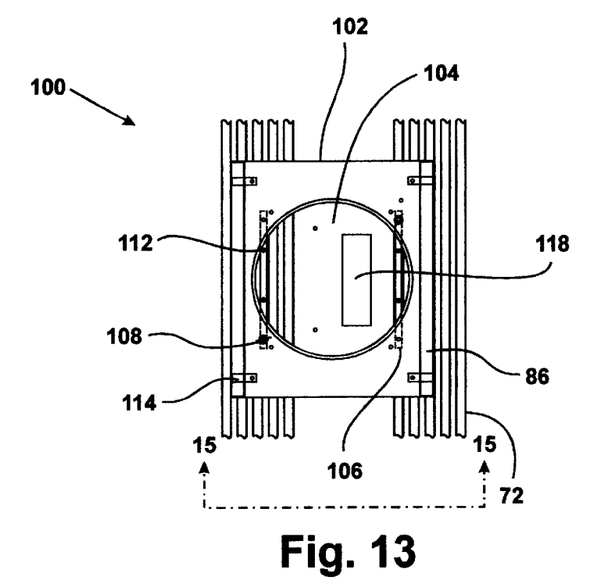
FIG. 13 is a top view of the saw turntable base assembly in the crosscut position.
Figure 14:
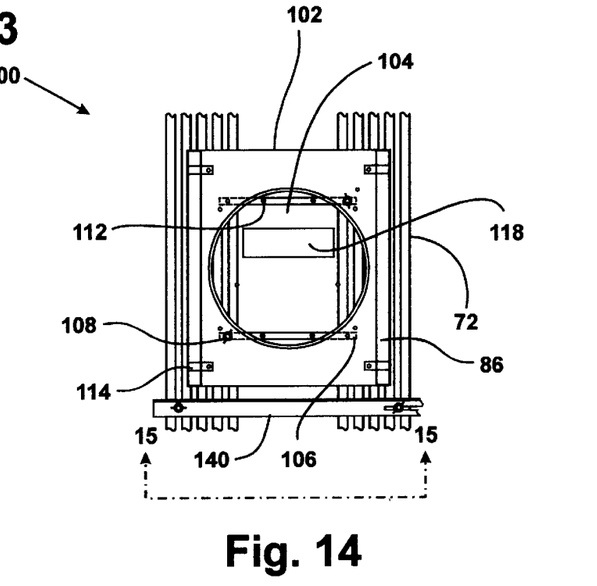
FIG. 14 is a top view of the saw turntable base assembly in the rip position.
Figure 15:
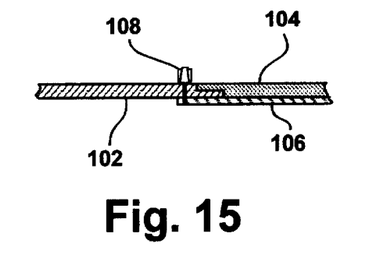
FIG. 15 is a section view of the saw turntable base assembly detailing how its components are related to one another.

FIG. 12 shows the saw turntable base plate subassembly, generally at 100. Saw turntable base plate assembly 100 comprises base plate 102, which is made of steel or aluminum, turntable 104, which is made of plexiglass or other similiar impact-resistant clear material. Turntable 104 is rotatably mounted to base plate 102 by means of screws 112 and retainers 106. FIG. 15 shows that base plate 102 and turntable 104 are shaped so as to present smooth surfaces on their top and bottom, while allowing turntable 104 to smoothly rotate within base plate 102 due to being captured by retainers 106. Wing screws 108 protrude down through base plate 102 into threaded holes in retainers 106, and are used to hold turntable 104 in either the crosscut position as shown in FIG. 13, or the rip position as shown in FIG. 14. Note the placement of wing screws 108 with respect to the orientation of turntable 104. Workpiece surface tubes 72 and large diameter tubes 86 are shown for clarity.

A portable electric circular saw 12 is mounted to turntable 104 by means of portable saw retaining clips 110. Saw slot 118 is provided to allow the saw's blade to protrude down through turntable 104. Saw turntable base plate subassembly 100 is mounted to cradle subassembly 80 by means of mounting clamps 114 capturing large diameter tubes 86 (shown here for clarity).

During use, saw 12 is mounted to turntable base plate subassembly 100 as previously described and plugged into switch receptacle 210. The assembly is prepared for use by placing in a convenient position, which may be on a table, a pair of sawhorses, or any appropriate setting. Turntable 104 is placed in the desired position (rip or crosscut) as previously described. When in the crosscut position (FIG. 13), friction locks 88 are loose, allowing large diameter tubes 86 to freely move back and forth on small diameter tubes 84. This effectively makes the assembly behave like a radial arm saw. Short fence subassembly 120 and medium fence assembly 130 are placed in their desired positions and at the desired angle. The saw is energized with switch 205. The saw (attached to turntable base plate subassembly 100) is moved along the lengths of small diameter tubes 84 until the wood piece is cut as desired. When in the rip position (FIG. 14), turntable base plate subassembly 100 is moved along the lengths of small diameter tubes 84 until the desired position is reached, then friction locks 88 are turned until the turntable base plate subassembly is immobile. Long fence assembly 140 is secured at the desired position as previously described. The saw is energized with switch 205, and the wood piece to be ripped is moved across the assembly parallel to and against long fence assembly 140 until the desired cut is made.

In either the rip or crosscut position, the saw may be tilted to achieve an angle cut. When such a cut is made in concert with an angled crosscut, it results in a compound cut.

What is claimed is:

1. A portable woodworking device comprising:

a frame subassembly, said frame subassembly made from welded metal tubing for strength and light weight;

a roller subassembly supporting said frame subassembly, said roller subassembly comprising wheels;

said roller subassembly being removably mounted to said frame subassembly by means of mechanical fasteners;

a workpiece support subassembly selected from steel, aluminum, and other strong, durable metal material supported by said frame subassembly, said workpiece support subassembly comprising a plurality of round hollow metal tubes and at least one extension subassembly, and at least one fence subassembly, said extension subassembly comprising a plurality of round hollow metal tubes;

said extension subassembly mounted to said workpiece support assembly with mechanical adjusting means for adjusting said extension subassembly in and out;

said workpiece support assembly supporting a cradle subassembly; said cradle subassembly mounted to said frame subassembly;

said cradle subassembly comprising mechanical fastening means for adjusting its height above said workpiece support subassembly, said cradle subassembly supporting a saw turntable base plate having a saw turntable base plate subassembly to mount a commericially available electric circular saw to said portable woodworking device; said cradle subassembly comprising hollow tubes of different diameters, axially aligned, allowing the large diameter tube to move freely along the length of the smaller diameter tubes; said larger diameter tubes employ locking means to maintain a fixed position on said smaller diameter tubes.

2. A portable woodworking device according to claim 1 wherein said frame subassembly includes a switch assembly to allow safe operation of a mounted electric circular saw.

3. A portable woodworking device according to claim 1 wherein said frame subassembly has legs and feet to allow said portable woodworking device to be placed on a flat surface.

4. A portable woodworking device according to claim 3 wherein said feet comprise suction cups made of rubber to reduce slippage during use.

5. A portable woodworking device according to claim 1 wherein said extension subassembly is made of the same material as said workpiece support subassembly.

6. A portable woodworking device according to claim 1 wherein said saw turntable base plate subassembly comprises a turntable made of impact resistant clear material.

7. A portable woodworking device according to claim 1 wherein said saw turntable comprises a blade slot to allow the blade of said saw to protrude down and contact the wooden workpiece.

8. A portable woodworking device according to claim 1 wherein said turntable is mounted to said metal plate by removable mechanical retaining means.

9. A portable woodworking device according to claim 8 wherein said removable mechanical retaining means capture said metal plate, allowing said turntable to freely rotate about its vertical axis.

10. A portable woodworking device according to claim 1 wherein a commercially available electric circular saw is mounted to said turntable by mechanical fasteners.

11. A portable woodworking device according to claim 1 having a plurality of different sized fence subassemblies.

12. A portable woodworking device according to claim 11 wherein said fence subassemblies are secured to said workpiece support subassembly by means of mechanical fasteners.

13. A portable woodworking device according to claim 12 including means for mounting said fence subassemblies at any angle respective to said workpiece support subassembly to facilitate various angled cuts in the wooden workpiece.

* * * * *